No. 866,169. PATENTED SEPT. 17, 1907.
J. VOLLMER.
GAS COOLER.
APPLICATION FILED FEB. 21, 1906.

3 SHEETS—SHEET 1.

WITNESSES.
M. E. Flaherty.
M. V. Foley.

INVENTOR.

No. 866,169. PATENTED SEPT. 17, 1907.
J. VOLLMER.
GAS COOLER.
APPLICATION FILED FEB. 21, 1906.

3 SHEETS—SHEET 2.

WITNESSES.
INVENTOR

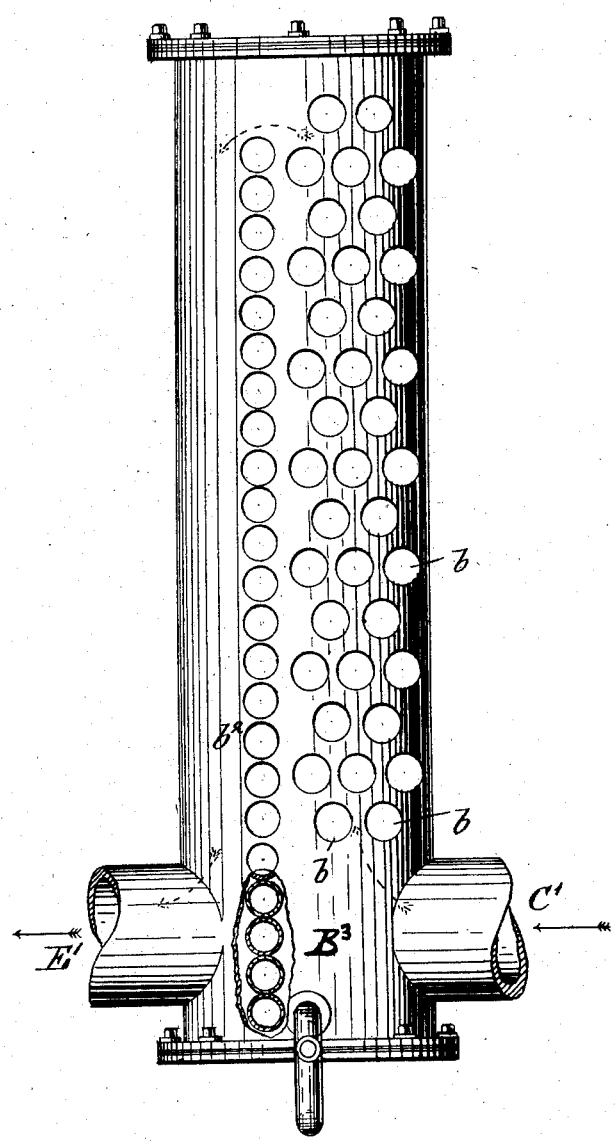

UNITED STATES PATENT OFFICE.

JOHN VOLLMER, OF BOSTON, MASSACHUSETTS.

GAS-COOLER.

No. 866,169.  Specification of Letters Patent.  Patented Sept. 17, 1907.

Application filed February 21, 1906. Serial No. 302,180.

*To all whom it may concern:*

Be it known that I, JOHN VOLLMER, of Boston, in the county of Suffolk and State of Massachusetts, a citizen of the United States, have invented a new and useful Improvement in Gas-Coolers, of which the following is a specification.

The gas cooler herein described which embodies my invention is especially adapted for use in wood-pulp-making systems where it is necessary to cool the gas before it will combine with lime water or other similar material. As the apparatus, however, does not depend for its value upon the kind of gas used with it I do not mean to describe my invention as limited to a wood-pulp system in which any especial kind of gas is used, nor do I mean to limit its use to the forming of a part of a wood-pulp system as it may be equally useful under other conditions.

It consists primarily in providing a gas cooler with a dust chamber wherein the dust or other solid impurities brought over by the gas may be collected at a point where it will not interfere with the cooling of the gas and from which it may be removed without taking the entire apparatus apart.

In gas coolers such as are ordinarily used the gas is passed through a coil of pipe located in a water bath kept at a proper temperature but, more especially in the sulfite or pyrites processes, so-called, the gas often brings over solid impurities in the form of dust, more or less sulfur, etc., and these impurities stick to the walls of the pipe, thereby not only reducing the size of the interior of the pipe and thus retarding the flow of gas, but also by thickening the walls of the pipe reducing the efficiency of the water surrounding the coil as a cooler.

My invention will be understood by reference to the drawings, in which—

Figure 1:
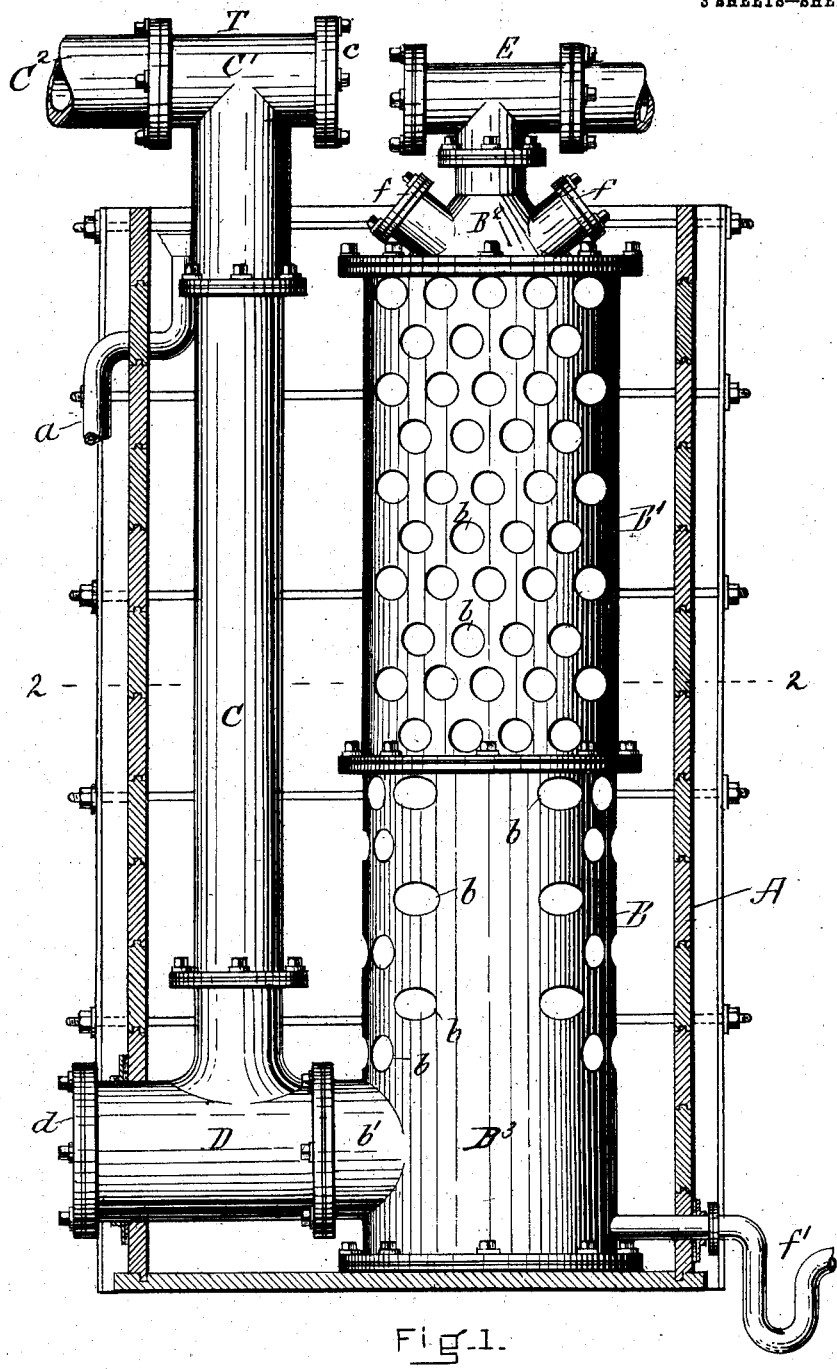
Figure 2:
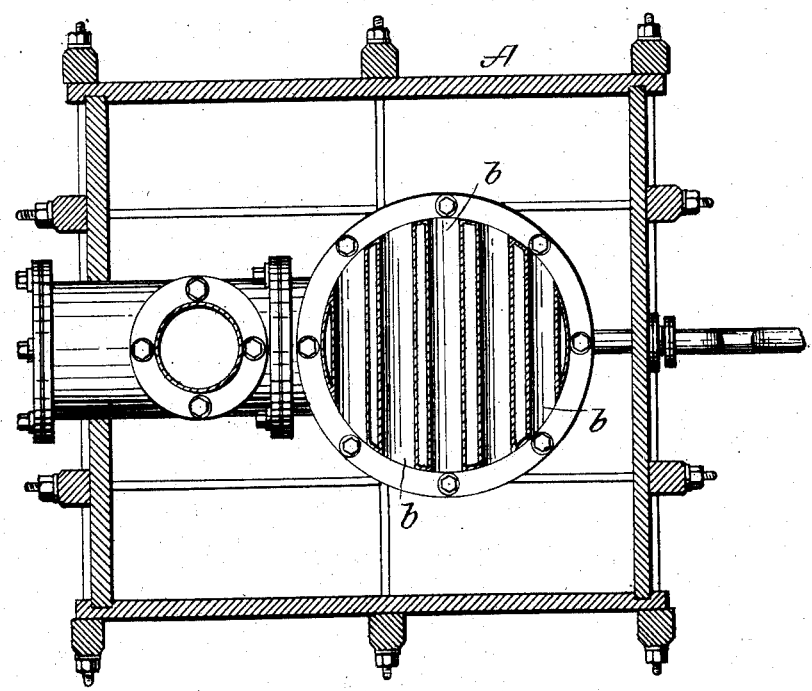

Figure 1 is a front elevation of my apparatus, the front wall of the tank being removed to show its interior arrangement. Fig. 2 is a horizontal section on line 2—2 of Fig. 1. Fig. 3 shows a modification.

A is a water-tight wooden tank on the floor of which my apparatus stands. This tank is provided with suitable means for keeping it full of water at proper temperature and with an overflow $a$ leading to the sewer or other convenient place.

The main portion of my invention comprises a gas cooling chamber of peculiar construction. The gas chamber as shown in Fig. 1 is comprised of two sections B and $B^1$. Each section has a number of cross pipes $b$ passing through it and open at each end to the fluid with which the tank A is filled so that there may be a constant circulation of the cooling fluid through these pipes, and I prefer that the pipes passing through the section B shall be at right angles to those passing through the section $B^1$ in order to cause a more general movement of the gas within the gas chamber as it rises from the bottom to the top of the chamber. The chamber is preferably closed at the top by means of a dome $B^2$ connected with a T-joint E, by means of which the apparatus may be connected with the pipe running to the mixing tank. In the dome I also provide one or more openings covered with suitable covers $f$ by means of which when the covers are removed the interior of the gas chamber may be washed out from time to time and at the bottom of the gas chamber I provide a water outlet $f^1$ which as shown is in the form of a trap so that the water with which the interior of the chamber is to be washed, or any moisture which may be collected in the chamber from time to time, may run off. As shown in Fig. 1 this chamber has an inlet at $b^1$ provided with a suitable flange by which it is connected with a T-joint D, one end of which runs through a side wall of the water tank, while the other connects with the vertical pipe C. This pipe leads into the tank from the feed pipe $C^2$, being connected thereto by the joint $C^1$. I have shown the joint $C^1$ as a T, one end of which is closed by the cover $c$. The end of the joint D which runs through the side wall of the tank has a cover $d$ which is removable so that the interior of the chamber within the lower part of the gas cooling chamber may be easily cleaned out.

The lower part of the gas chamber below the lowest pipes $b$ forms an unobstructed dust chamber indicated by the letter $B^3$, into which the dust, flowers of sulfur, or other solid impurities are driven by the force of the gas entering through the pipe C. Here, however, they are dropped by the gas as it changes direction, and remain. Such particles as may be carried up through the gas cooling chamber and have become disentangled from the gas as it passes around the pipes $b$ will fall back into this dust chamber.

In the operation of my apparatus the tank A is first filled with water at a low temperature up to a level practically controlled by the overflow $a$. The temperature is maintained by any suitable means, for example,—a continuous stream of water running into the tank. The gas flows in through the pipe C and joint D, and getting a certain amount of chilling in its downward passage enters the dust chamber $B^3$ and leaves there its solid impurities. Passing up through the cooler it engages and is brought in thorough contact with the various cross pipes through which as the temperature of the water changes there is a constant circulation thereof. It will be noted that the pipes $b$ are arranged to obstruct the path of the gas so that its course through the cooler will insure its being cooled. Passing up the gas passes out through the dome $B^2$ and joint E, from which it is conducted to any desired place.

I have shown in Fig. 3 another form of gas chamber which embodies my invention. I have found that it is more convenient in some places to place the gas inlet and outlet to a cooler at the bottom of the tank, and in Fig. 3 I have shown simply the gas cooling chamber which is intended to rest upon the floor of the tank, the tank being omitted. In this case the inlet is represented at $C^1$, the outlet at $E^1$ and the circulation of gas is caused by the wall of cross tubes $b^2$ which with the tubes $b$ not only furnish an opportunity for circulation of water across the gas chamber for cooling purposes, but these tubes $b^2$ being close together cause the gas or the greater part of it to pass upward and over the top thereof and down the further side to the outlet $E^1$. In this case the dust chamber is also shown at $B^3$ located at the gas inlet and below the lowest of the tubes $b$, though of course not below the wall of tubes $b^2$ which runs to the bottom of the gas chamber. Other variations of this idea will no doubt occur to one skilled in the art, the main novelty of this apparatus consisting in providing a dust chamber in the path of the gas and preferably before its cooling takes place, in which it may drop any matters mechanically carried by it so that they will not be taken up by other portions of the apparatus located where it is difficult to get at them to clean them. I also believe that the idea of cooling the gas by a series of pipes containing a cooling fluid passing across the line of movement of the gas and in its path is new with me. Apparatus of this character should of course be constructed of such material as will not be corroded by the gas and for this purpose I have found lead under all ordinary conditions the best material.

What I claim as my invention is:—

1. A gas cooler having a tank, a gas-receiving chamber located inside said tank and having a series of circulating tubes passing through it in communication with the interior of the tank, and a gas inlet pipe leading down into said tank to connect with said gas-receiving chamber at or near the bottom thereof.

2. A gas cooler having a tank, a gas inlet pipe leading down into said tank, a gas-receiving chamber also located within said tank, a joint connecting said inlet pipe with said gas chamber, a manhole located in said joint in line with the lower part of said gas chamber, and provided with a suitable cover whereby upon the removal of said cover the lower part of said gas chamber may be cleaned, as and for the purposes specified.

3. A gas cooler having a tank and inside the same a gas-receiving chamber, man-holes located at the top of said gas-receiving chamber forming access to the interior thereof, and at the bottom of said chamber an outlet having formed therein a trap.

4. A gas cooler having a gas-receiving chamber provided with an inlet at or near the bottom thereof, a gas outlet to said chamber at or near the bottom thereof, and intermediate said inlet and outlet passages means whereby the gas will be made to circulate upwardly through said tank, thence down to said outlet passage, substantially as described.

JOHN VOLLMER.

Witnesses:
GEORGE O. G. COALE,
M. E. FLAHERTY.